(12) United States Patent
Caragea et al.

(10) Patent No.: US 10,776,368 B1
(45) Date of Patent: Sep. 15, 2020

(54) DERIVING CARDINALITY VALUES FROM APPROXIMATE QUANTILE SUMMARIES

(71) Applicant: Amazon Technologies, Inc., Seattle, WA (US)

(72) Inventors: George Constantin Caragea, Redwood City, CA (US); Andrew Edward Caldwell, Santa Clara, CA (US); Anurag Windlass Gupta, Atherton, CA (US); Michail Petropoulos, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 15/650,704

(22) Filed: Jul. 14, 2017

(51) Int. Cl.
*G06F 17/00* (2019.01)
*G06F 16/2458* (2019.01)
*G06F 16/2453* (2019.01)

(52) U.S. Cl.
CPC .... *G06F 16/2462* (2019.01); *G06F 16/24545* (2019.01); *G06F 16/24542* (2019.01)

(58) Field of Classification Search
CPC ........... G06F 16/2462; G06F 16/24545; G06F 16/24542
See application file for complete search history.

(56) References Cited

U.S. PATENT DOCUMENTS

| 6,477,523 B1* | 11/2002 | Chiang ............... G06F 16/2462 |
| 7,633,592 B2 | 12/2009 | Kobashi et al. |
| 2006/0074875 A1* | 4/2006 | Faunce ............... G06F 16/2462 |
| 2016/0188705 A1 | 6/2016 | Schreck et al. |
| 2016/0342667 A1* | 11/2016 | Chen ..................... G06F 16/258 |

OTHER PUBLICATIONS

Manku et al., "Approximate Medians and other Quantiles in One Pass and with Limited Memory". 1998 (Year: 1998).*
Liechty et al., "Single-pass low-storage arbitrary quantile estimation for massive datasets". 2003 (Year: 2003).*
Chiranjeeb Buragohain, et al., "Quantiles on Streams", Encyclopedia of Database Systems, 2009, Springer, pp. 2235-2239.

* cited by examiner

*Primary Examiner* — Syed H Hasan
(74) *Attorney, Agent, or Firm* — Robert C. Kowert; Kowert, Hood, Munyon, Rankin & Goetzel, P.C.

(57) ABSTRACT

Cardinality values can be derived from an approximate quantile summary. An approximate quantile summary can be generated for a column of a database table at data ingestion, data update, upon request, in response to a query, and in various other scenarios. When a query is received that includes a predicate directed to the column of the approximate quantile summary, a cardinality value may be derived from the boundary values of one or more quantiles that include the predicate. The cardinality value may then be used to select a query plan. The query may be performed according to the selected query plan.

20 Claims, 10 Drawing Sheets

DERIVING CARDINALITY VALUES FROM APPROXIMATE QUANTILE SUMMARIES

BACKGROUND

As the technological capacity for organizations to create, track, and retain data continues to grow, a variety of different technologies for managing the rising tide of information have been developed. Database and other data store technologies, for example, have implemented support for querying languages and protocols that allow users to search for and modify data stored in a large data set by submitting queries. Because the amount of data access by queries is growing, minimizing the amount of time and other resources consumed to perform queries is increasingly important.

Planning the performance of a query is often implemented in order to select the most cost efficient way to perform the query. The cost to perform different operations for the query may be estimated so that different operations or configurations of operations may be selected to provide the optimal query plan. Techniques that improve the cost estimation of different operations can improve the accuracy of query planning and thus are desirable.

Figure 1:
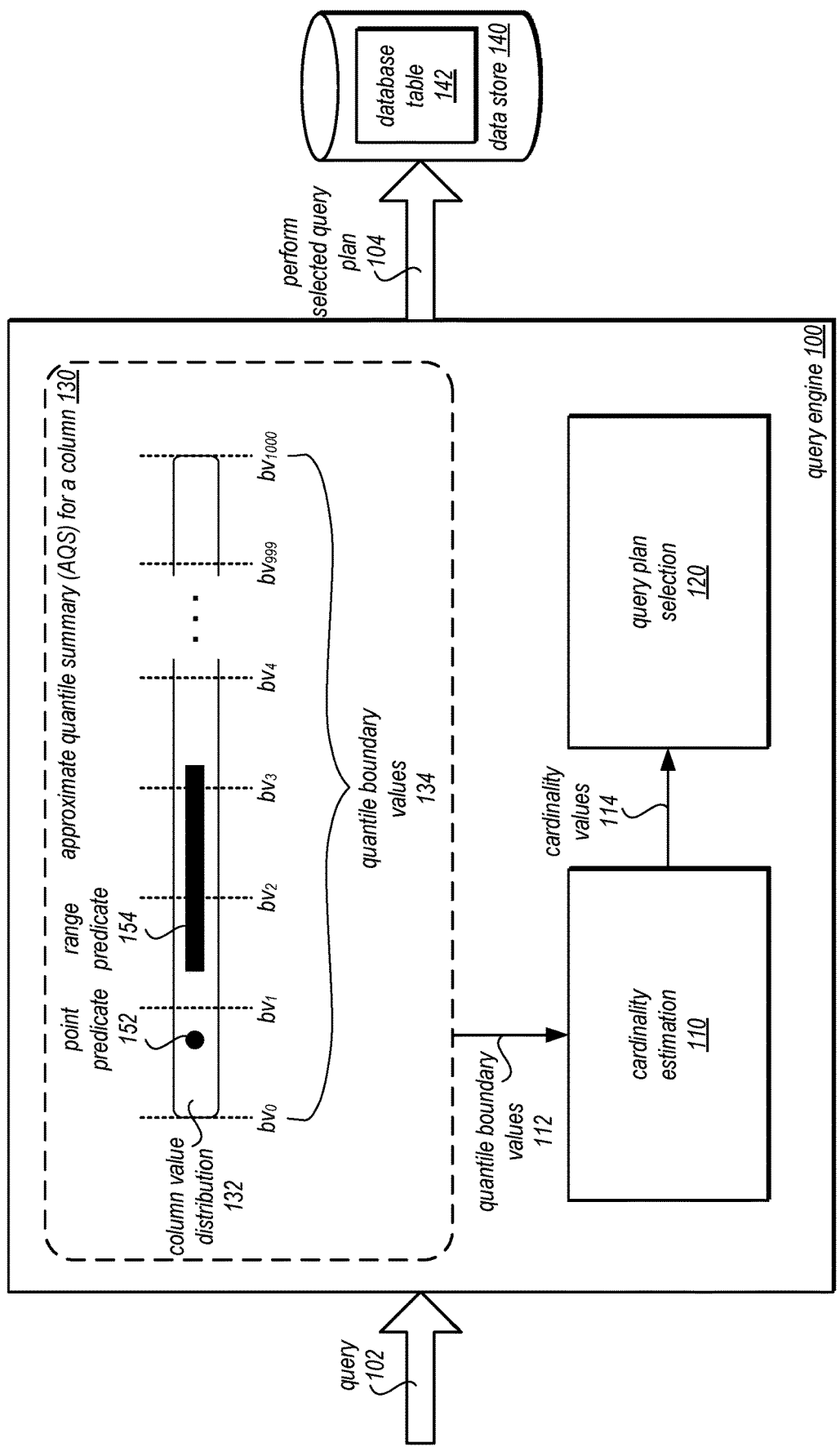
FIG. 1 illustrates a logical block diagram of deriving cardinality values from approximate quantile summaries, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of deriving cardinality values from approximate quantile summaries are described herein. Query plans are implemented in various embodiments to provide to identify operations to execute in order to perform a query directed to a database or other data. Query plans may be generated by selecting the ordering, configuration, and type of operations to perform based on estimated costs for different possible orderings, configurations, and/or types of operations that may be accomplish the query, in some embodiments. For example, a query plan may order join operations that join data from different database tables in a database so that the criteria of the join that returns the fewest number of rows in one table is performed before joins with less selective criteria, and thus return higher number of rows, in one embodiment. Ordering the more selective join first may result in fewer numbers of other items that have to be accessed or processed as the number of potential items has already been reduced by the more selective join. In order to determine the selectivity, and thus cost of operations within query plans, a cardinality value which indicates how many rows, entries, or items in the database table satisfy a query predicate directed to a particular column can be determined, in some embodiments. The higher the fidelity of the cardinality values with respect to column values in the database table, the more accurate cost-based selections for a query plan may be. Deriving cardinality values from approximate quantile summaries may provide cardinality values with much higher fidelity to the distribution of column values in a database table, improving the performance of queries as the selected query plans may make better cost-based selections.

FIG. 1 illustrates a logical block diagram of deriving cardinality values from approximate quantile summaries, according to some embodiments. Query engine 100 may be a query engine implemented to process access requests or other queries 102 with respect to a database table 142 stored in a data store 140. Data store 140 may be one or more storage devices that are remote (e.g., via a network connection across one or more network hops) or local (e.g., directly attached storage devices to a system, such as computing system 1000 in FIG. 10 implementing query engine). Database table 142 may be a table in a database or other data storage system, including relational and non-relational database systems (e.g., for which a schema including a column can be inferred), in some embodiments. Query engine 100 may accept queries 102, determine a query plan, and perform the selected query plan 104 with respect to the database table 142 in data store 140. Note that in some embodiments, queries may be directed to multiple tables (which may be stored in the same or different data store) so the previous discussion is not intended to be limiting as to the number or configuration of database tables that are targeted by query 102.

Query engine 100 may maintain or have access to an approximate quantile summary (AQS) for a column 130 in database table 142 in some embodiments. For example, the AQS may be stored along with other table statistics in a local data store accessible to query engine 100 or a remote metadata store for database table 142, in some embodiments. AQS 130 may be generated according to approximate quantile summary generation techniques, such as streaming techniques that process each column value in the column to approximate the quantile summary for the column, and may include, in some embodiments, a number of quantiles that balance distribution of the columns values 132 across the different quantiles according to an order for the column values (e.g., numerical ordering from lowest to highest, alphabetical order, or some other logical ordering of column values), in some embodiments. For example, column values may be distributed across 1,000 quantiles, so that the percentage or fraction of column values located in each quantile is $1/1000$ (0.001 or 0.1%), so that the first quantile may include the lowest $1/1000$ or otherwise earliest $1/1000$ of column values in the ordering/ranking of column values, the second quantile may include the second $1/1000$, and so on. Quantile boundary values 134, such as boundary values, $bv_0$ to $bv_{1000}$, may map these distribution or percentage values of a quantile to column values included within a quantile, in various embodiments. If, for instance, the column values are timestamps, such as may be described by the format of MM-DD-YYYY 00:00:00, then "$bv_0$" boundary value may map the minimum column value of the column included in the first quantile (e.g., 01-01-2010 00:00:01) and "$bv_1$" may provide a maximum boundary value (e.g., 02-17-2010 13:07:16) to the first $1/1000$ of column values, so that the number of column values included in the first quantile may be represented by the quantile percentage, $1/1000$. In this way, quantile boundary values may map column values to percentage or fraction values of total rows, entries, or items in the table that will have column values in the quantile, in some embodiments.

Query engine 100 may implement cardinality estimation 110 to derive cardinality values for predicate(s) of query 102 from quantile boundary values 112 that include the predicate of the query directed to the column for which AQS 130 is generated. For example, point predicate 152 may be a predicate directed to the column that specifies a single column value. The column value specified by the predicate or that otherwise satisfies the predicate criteria may be compared with quantile boundary values to determine that point predicate 152 is included in the first quantile. Predicates may be ranges of column values in some embodiments. For example range predicate 154 may be a range of column values that satisfy the predicate in the column, in some embodiments. Range predicates be within a single quantile or span multiple quantiles as illustrated in FIG. 1.

Cardinality estimation 100 may determine the cardinality values based on the quantile boundary values 112, in various embodiments. For example, as discussed in detail below with regard to FIGS. 7 and 8, the percentage or fraction of total values in the column that satisfies the predicate may be determined by the space occupied within the distribution of predicate values by performing a linear interpolation, in some embodiments. The boundary values are the known values that map a column value to a percentage so that the percentage or fraction of values that satisfy the predicate can be determined. In another example embodiment, the number of quantiles that include the predicate may be counted and then may be multiplied by the quantile percentage for individual quantiles, which in turn may be multiplied by the total number of rows, entries or items in the table to determine the cardinality value.

Cardinality estimation may provide the determined cardinality values 114 to query plan selection 120. Query plan selection 120 may input the cardinality values for the predicate(s) into cost models or functions for different operations or types of operations to determine a query plan that results in the lowest performance cost (e.g., network, I/O, processor, etc.), in some embodiments. Query engine 100 may then perform the selected query plan 104 with respect to database table 142 that was selected from the derived cardinality values from the AQS 130, in some embodiments.

Please note that the previous description of deriving cardinality values from an AQS for a column in a database table is a logical illustration and thus is not to be construed as limiting as to the implementation of a query engine, AQS, query, a database table, a data store, or other illustrated features.

This specification begins with a general description of a provider network that implements database services, storage services, and other services that may implement deriving cardinality values from approximate quantile summaries. Then various examples of one such service, a data warehouse service, including different components/modules, or arrangements of components/module that may be employed as part of implementing the techniques are discussed. A number of different methods and techniques to implement deriving cardinality values from approximate quantile summaries, some of which are illustrated in accompanying flowcharts. Finally, a description of an example computing system upon which the various components, modules, systems, devices, and/or nodes may be implemented is provided. Various examples are provided throughout the specification.

Figure 2:
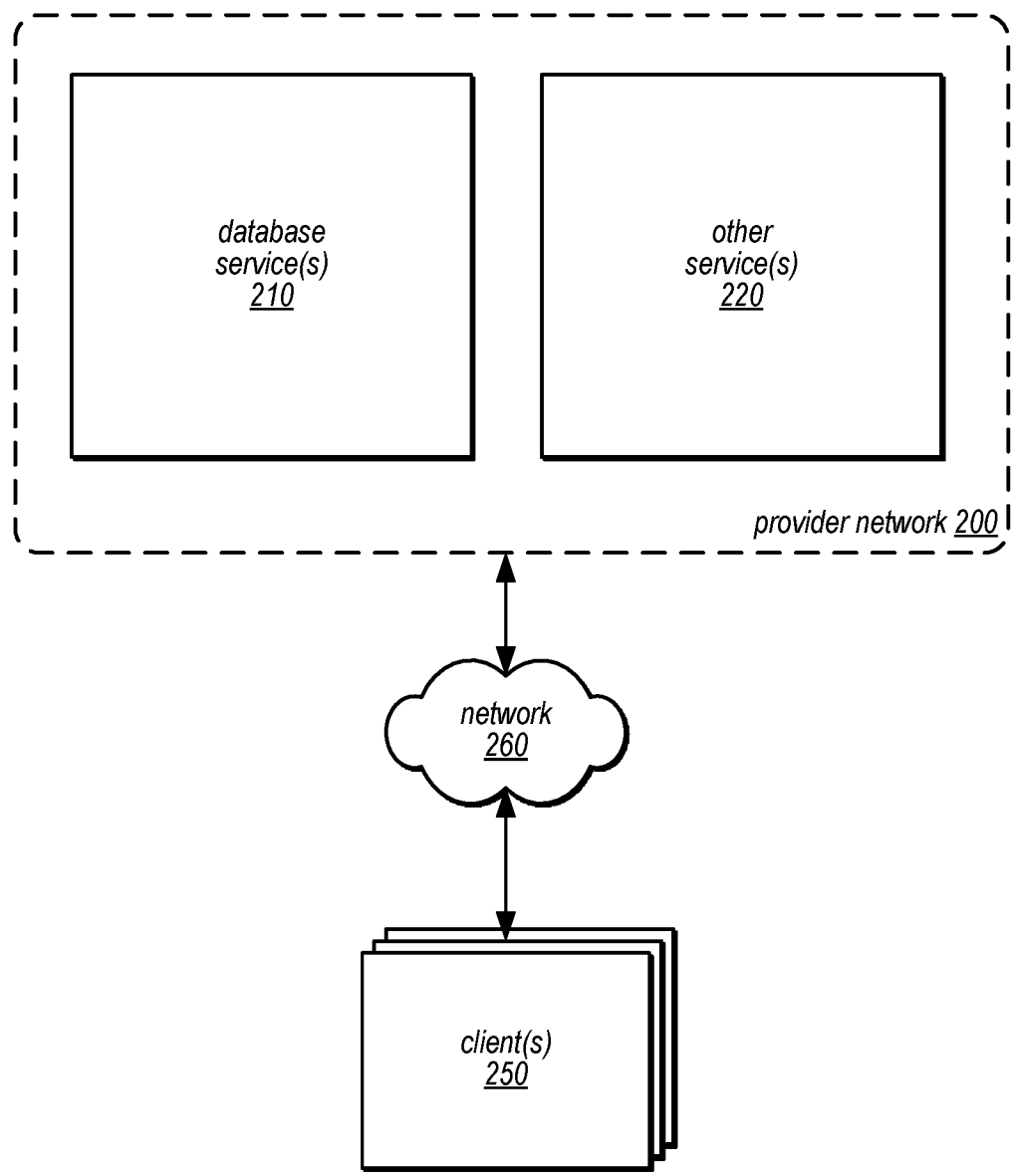
FIG. 2 is a logical block diagram illustrating a provider network offering database services that implement deriving cardinality values from approximate quantile summaries as part of performing queries to a database table hosted in the provider network, according to some embodiments.

FIG. 2 is a logical block diagram illustrating a provider network offering database services that implement deriving cardinality values from approximate quantile summaries as part of performing queries to a database table hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services), data storage services (e.g., object storage services or block-based storage services that may implement a centralized data store for various types of data), and/or any other type of network based services 220 (which may include a virtual compute service and various other types of storage, processing, analysis, communication, event handling, visualization, data cataloging (which may store schema information and other metadata for data stored in other services such as database service 210, or other services like data warehouse service 300 in FIG. 3 below), data ingestion (e.g., ETL), and security services not illustrated), in one embodiment.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 or other service(s) 220) may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is fully structured data, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below with regard to the example data warehouse service FIG. 3, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database services 210 may include services that process requests to data that is not stored in fully structured storage (e.g., non-relational or NoSQL databases). Database services 210 may access the data that is semi-structured or not-structured in storage, such as data objects of unstructured or semi-structured data in data storage service 220, in one embodiment. In other embodiments, database services 210 may locally store, managed, and access semi-structured or not-structured data.

Generally speaking, clients 250 may encompass any type of client that can submit network-based requests to provider network 200 via network 260, including requests for storage services (e.g., a request or other query to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 or other network services 220 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 or other services 220 may be coordinated by client 250 and the operating system or file system on behalf of applications executing within the operating system environment. Similarly, a client 250 may be an analytics application that relies upon database services to execute various queries for data already ingested or stored in the database service 210 (e.g., such as data maintained in a data warehouse service, like data warehouse service 300 in FIG. 3 below) or data stored in a data lake hosted in other storage service(s) 220 that may be accessible to a query engine implemented as part of database service(s) 210).

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
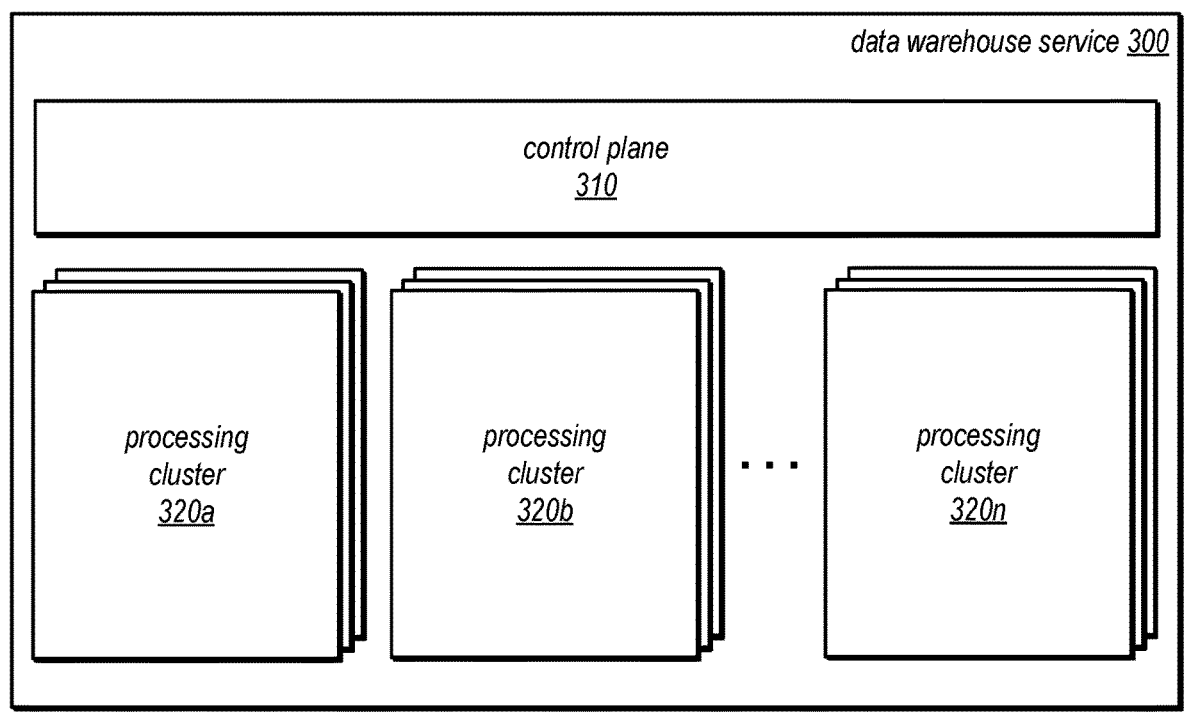
FIG. 3 is a logical block diagram of a data warehouse service that derives cardinality values from approximate quantile summaries as part of performing queries to a database table hosted in the data warehouse service, according to some embodiments.

In at least some embodiments, a database service 210 or data storage service 220 may be a data warehouse service. FIG. 3 is a logical block diagram of a data warehouse service that derives cardinality values from approximate quantile summaries as part of performing queries to a database table hosted in the data warehouse service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") data warehouse system. However, various versions of the components discussed below as may be equally adapted to implement embodiments for various other types of database or data warehouse systems, such as row-oriented database systems. Therefore, the following examples are not intended to be limiting as to various other types or formats of structured data that may be stored, accessed, or otherwise managed by a data warehouse, like data warehouse service 300.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300, in one embodiment. For example, as discussed below with regard to FIG. 6, the interface offered by control plane 310 may allow a client to select a column of a database table stored in data warehouse service 300 and generate an approximate quantile summary for the column that may be used to derive cardinality values for queries with predicates directed to that column.

As discussed above, various clients (or customers, organizations, entities, or users) may wish to store and manage data using a data warehouse service like data warehouse service 300. Processing clusters may respond to various requests, including write/update/store requests (e.g., to add data into storage) or other queries for data (e.g., such as a Server Query Language request (SQL) for particular data), as discussed below with regard to FIGS. 4-6, along with many other data management or storage services. Queries may be directed to data that is locally hosted as part of data warehouse service 300 or stored elsewhere that is fully structured data or queries directed to data that is not-structured, such as log records, event data, or machine generated data stored in another storage service.

Multiple users or clients may access a processing cluster to obtain data warehouse services, in one embodiment. In at least some embodiments, a data warehouse service 300 may provide network endpoints to the clusters which allow the clients to send requests and other messages directly to a particular cluster. Network endpoints, for example may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters, such as processing clusters 320a, 320b, through 320n, hosted by the data warehouse service 300 may provide an enterprise-class database query and management system that allows users to send data processing requests to be executed by the clusters 320, such as by sending a data processing request to a cluster control interface implemented by the processing clusters, in some embodiments. Processing clusters 320 may perform data processing operations with respect to data stored locally in a processing cluster. Requests sent to a processing cluster 320 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is store remote from the processing clusters, such as data stored in another service.

Processing clusters 320 may allow users of data warehouse service 300 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. Control plane 310 may direct scaling operations to right-size a processing cluster 320 for efficiently processing queries.

Figure 4:
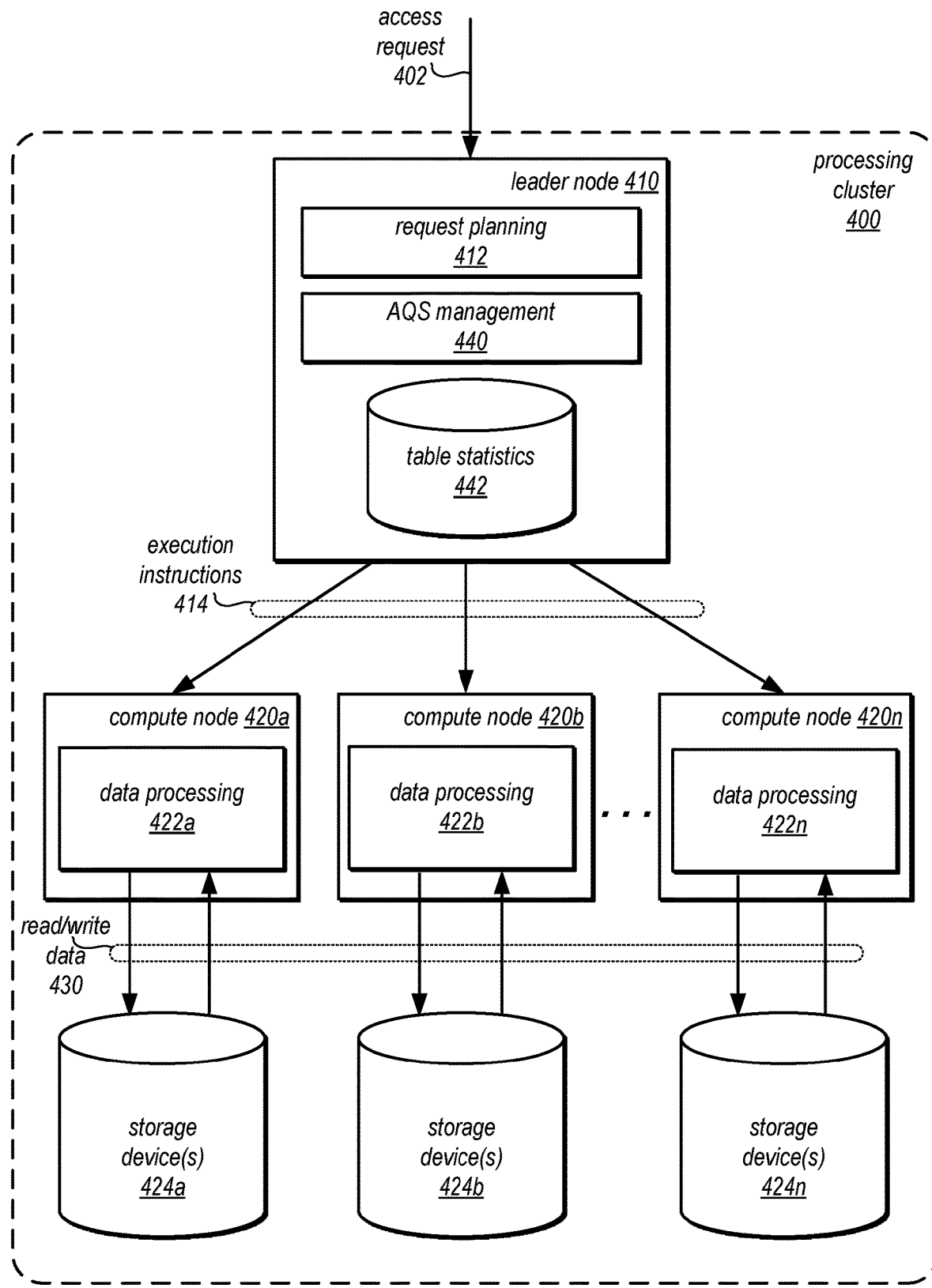
FIG. 4 is a logical block diagram illustrating a processing cluster of a data warehouse service, according to some embodiments.

FIG. 4 is a logical block diagram illustrating a processing cluster of a data warehouse service, according to some embodiments. Processing cluster 400 may be data warehouse service cluster, like processing clusters 320 discussed above with regard to FIG. 3, or another processing cluster that distributes execution of a query among multiple processing nodes, in one embodiment. As illustrated in this example, a processing cluster 400 may include a leader node 410 and compute nodes 420a, 420b, and 420n, which may communicate with each other over an interconnect (not illustrated), in one embodiment. Leader node 410 may implement request planning 412 (discussed in detail below with regard to FIG. 5) to generate plan(s) and instructions 414 for executing access requests or other queries on processing cluster 400, in one embodiment. Leader node may implement AQS management 440 (discussed in detail below with regard to FIG. 6) to generate and update approximate quantile summaries for columns of a database table stored in data warehouse service 300 in table statistics 442, in some embodiments. As described herein, each node in a processing cluster 400 may include attached storage, such as storage device(s) 424a, 424b, and 424n, on which a database (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 400 is a leader node as illustrated in FIG. 4, but rather different nodes of the nodes in processing cluster 400 may act as a leader node or otherwise direct processing of requests to data stored in processing cluster 400, in one embodiment. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another service (e.g., database service(s) 210, storage service(s) 220, or other data processing service(s)). Leader node 410 may manage communications with clients, such as clients 250 discussed above with regard to FIG. 2, in one embodiment. For example, leader node 410 may be a server that receives an access request (e.g., a query for data or a request to add data) 402 from various client programs (e.g., applications) and/or subscribers (users), then parses them and develops an execution plan (e.g., query plan(s)) to carry out the associated database operation(s).

Leader node 410 may develop the series of steps necessary to obtain results for the access request 402, in one embodiment. Access request 402 may be a query directed to a database table that is stored within processing cluster 400 (e.g., at one or more of compute nodes 420), in one embodiment. Leader node 410 may also manage the communications among compute nodes 420 instructed to carry out database operations for data stored in the processing cluster 400, in one embodiment. For example, node-specific request instructions 414 may be generated or compiled code that is distributed by leader node 410 to various ones of the compute nodes 420 to carry out the steps needed to perform access request 402, including executing the code to generate intermediate results of access request 402 at individual compute nodes that may be sent back to the leader node 410, in one embodiment. Leader node 410 may receive data and responses or results from compute nodes 420 in order to determine a final result for access request 402, in one embodiment. A database schema, data format and/or other metadata information for the data stored among the compute nodes, such as the data tables stored in the cluster, may be managed and stored by leader node 410 or obtained from a separate store (e.g., a data catalog service). Request planning 412, as discussed in more detail below with regard to FIG. 5, may include the generation and selection of a query plan to perform access requests 402.

Processing cluster 400 may also include compute nodes, such as compute nodes 420a, 420b, and 420n. Compute nodes 420, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 422a, 422b, and 422n, to execute the instructions 414 or otherwise perform the portions of the request plan assigned to the compute node, in one embodiment. Data processing 422 may access a certain memory and disk space in order to process a portion of the workload for a query (or other database operation) that is sent to one or more of the compute nodes 420. Data processing 422 may access attached storage, such as 422a, 422b, and 422n, to perform operation(s), in one embodiment. For example, data processing 422 may scan data in attached storage 424, access indexes, perform joins, semi joins, aggregations, or any other processing operation assigned to the compute node 420, in one embodiment. Compute nodes 420 may send intermediate or final results from requests back to leader node 410 for final result generation (e.g., combining, aggregating, modifying, joining, etc.). Data, such as a database table, may be partitioned or otherwise distributed across the storage device(s) 424 as different partitions or shards of the data, in some embodiments. Compute nodes 420 may receive instructions specific to the shard(s) or partition(s) of the data to which the compute node 420 has access.

Storage device(s), such as storage devices 424a, 424b, and 424n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 5:
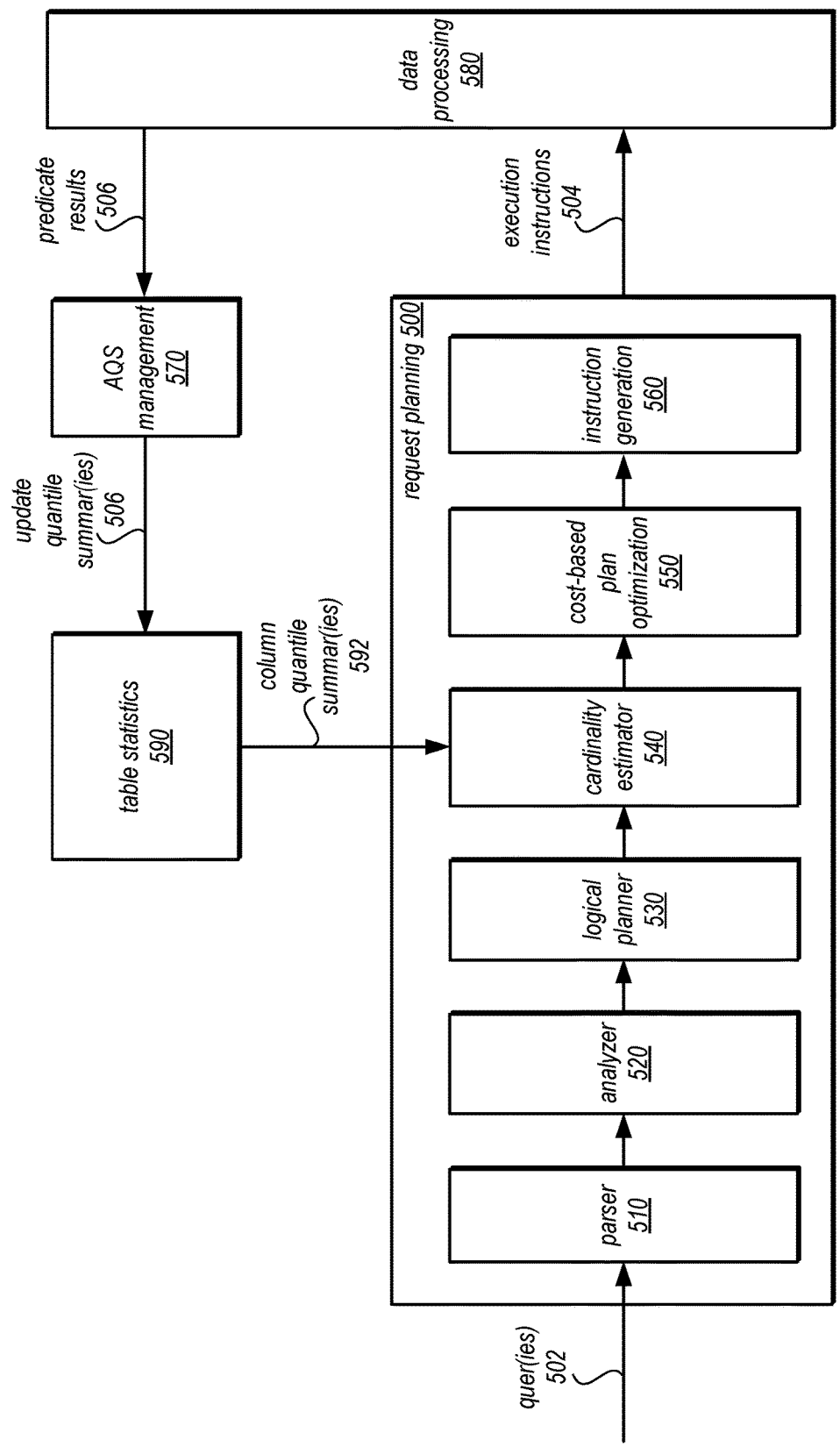
FIG. 5 is a logical block diagram illustrating request planning for performing queries that includes cardinality values derived from approximate quantile summaries, according to some embodiments.

FIG. 5 is a logical block diagram illustrating request planning for performing queries that includes cardinality values derived from approximate quantile summaries, according to some embodiments. Request planning 500 may implement parser 510 to receive a query 502 (e.g., a query statement, such as a SQL statement, other type of request to access data to find, search, add, modify, remove, or delete data) and determine the various requested operations to perform as a result of the request. For example, parser 510 may generate a parse tree for a given request input string to separate out the various request clauses, fields, flags, predicates, conditions, commands, or other information for planning and optimization. Request planning 500 may implement analyzer 520, in some embodiments. The parsed results of the query (e.g., a parse tree or other data structure) may be evaluated by analyzer 520 for errors or other validation of the query. If, for example, there is an error in query syntax (e.g., SQL errors, such as misspelled key words, wrong command arrangements, incorrect field specifications), then analyzer 520 may detect the invalid query feature.

In some embodiments, request planning 500 may implement logical planner 530. Logical planner 530 may perform rules-based optimizations to the parsed query that identifies and arranges the performance of query performance operations (e.g., join push downs, scans, filters, aggregation, etc.) to determine a tree of logical operations to be performed as an initial query plan. For example, rules-based optimizations may include rules that always re-order certain operations, such as joins, in defined circumstances, in some embodiments.

In at least some embodiments, request planning 500 may implement cardinality estimator to determine cardinality values for different predicates. As discussed above with regard to FIG. 1 and FIGS. 7 and 8 below, cardinality values may be derived from approximate quantile summaries generated for a column. Cardinality estimator 540 may identify predicates within quer(ies) 502 for joins, filters, or other operations that rely upon criteria to perform, in some embodiments, that are directed to columns of a database table. Cardinality estimator may access table statistics 590 to obtain column approximate quantile summar(ies) 592 for the respective columns identified in predicates. If both column A and column B are identified in predicates, then the approximate quantile summaries for columns A and B may be obtained 592. In some embodiments table statistics 590 may be located at a leader node, as described above with regard to FIG. 4. In other embodiments, table statistics may be maintained in other locations, such as compute nodes, or in a separate metadata store for the table or with the data of the table. Cardinality estimator 540 may identify the boundary values of the quantile(s) that include the predicate(s) of quer(ies) 502 and may perform linear interpolation using as input values the identified boundary values to determine a fraction or percentage of items in the table that satisfy the predicate. The fraction or percentage of items in the table with column values that satisfy the predicate may be multiplied by the size of the table to determine the cardinality value for the predicate.

Cardinality estimator 540 may provide cardinality values for identified predicates, in some embodiments, to cost-based plan optimization 550. Cost-based plan optimization 550 may be implemented by request planning 500, in some embodiments, to optimize the initial query plan for cost, in some embodiments. Cost-based plan optimization 550 may, for instance, may determine cost values for different operations in the initial plan and/or generate different versions of the initial plan, which may have different orders of operations (e.g., join order) or types of operations (e.g., join type) are performed based on the cardinality values. For example, cardinality values may be input into a cost function for performing a hash join and compare that cost to the cost of performing a nested loop join (which may have a different cost function but utilize the same cardinality value) to determine whether the plan should include a hash join or nested loop join. In some embodiments, cost-based plan optimization may compare the costs between entire plans (e.g., cost of plan A vs. cost of plan B), instead of comparing individual operations.

In at least some embodiments, cost-based plan optimization 550 may include resource selection for performing queries. For example, cost models for executing queries on different types of query engines or other query performance resources may be maintained by request planning. The derived cardinality values may be used to select which query engine types or other performance resources should perform the query using the cardinality values as input to the cost models for the query engine changes. For example, different query engines may be implemented on compute nodes in a data warehouse cluster, such as a data warehouse cluster in FIGS. 3 and 4 above. The cost-based plan optimization may first select which type of query engine to perform the query based on the initial plan and may then perform further cost-based optimizations specific to the selected engine type for the query plan, in some embodiments.

Request planning 500 may implement instruction generation 560, in some embodiments. Request planning 560 may populate a template, message, request, or other data structure for performing execution instructions 504. A remote data processing client, such as compute nodes in FIG. 4 implementing data processing 580, may interpret, access, or utilize the data structure to execute the instructions 504. In some embodiments, instruction generation 560 may identify or determine which compute nodes or components implementing data processing 580 should perform operations in the query plan (as different compute nodes may perform different plan operations, for instance), in some embodiments.

Figure 8:
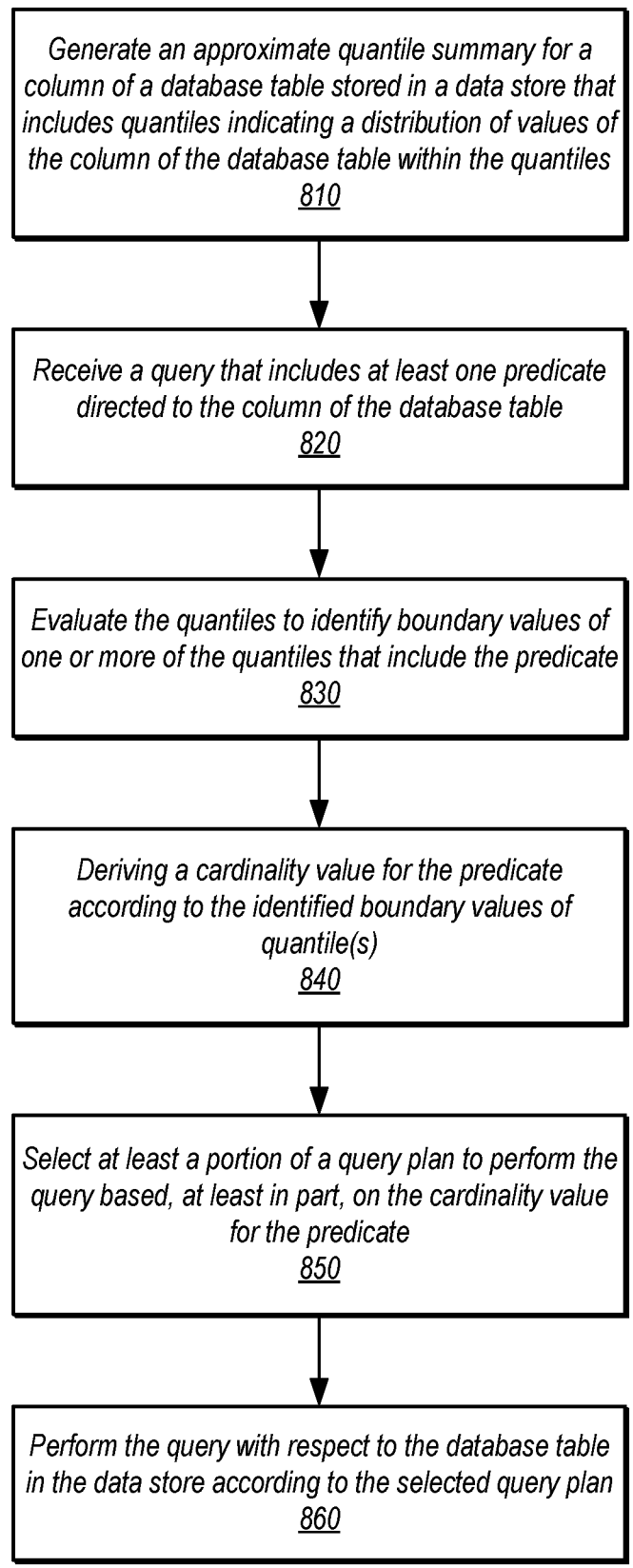
FIG. 8 is a high-level flowchart illustrating methods and techniques to generate an approximate quantile summary for deriving cardinality values, according to some embodiments.

In at least some embodiments, data processing 580 may collect, determine, or otherwise provide actual predicate results 506 (e.g., the actual cardinality value of a predicate as determined by accessing the data) to AQS management 570 (as discussed in detail below with regard to FIG. 8. AQS management 570 may update the quantile summar(ies) 506 based on the collected predicate results. For example, boundary values for quantiles may be adjusted (e.g., incremented or decremented) to better reflect a balanced distribution of column values amongst the quantiles. In some embodiments, error values or estimates for an AQS for a column may be updated, in some embodiments (e.g., by increasing or decreasing the error value).

Figure 6:
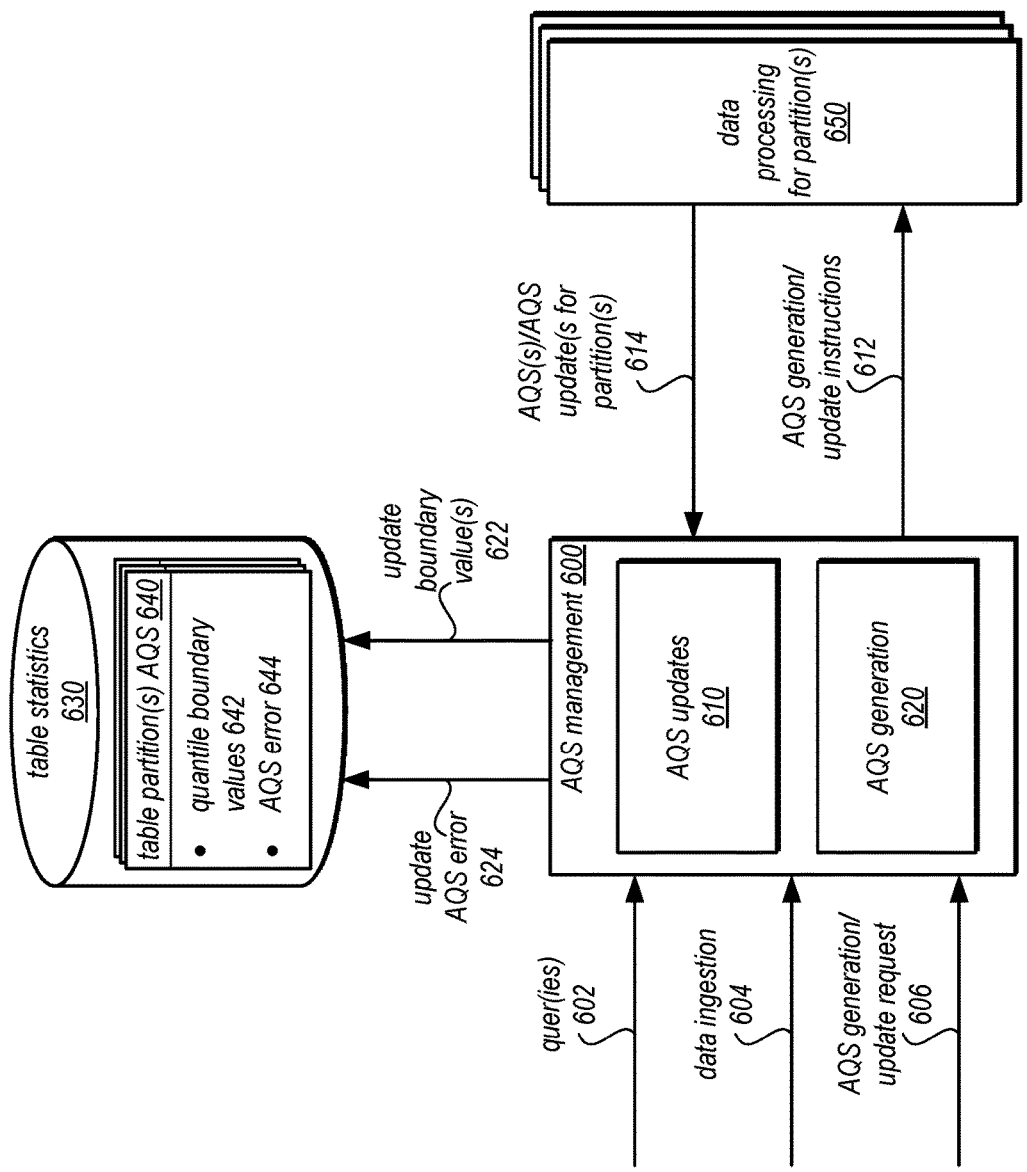
FIG. 6 is a logical block diagram illustrating approximate quantile summary management, according to some embodiments.

FIG. 6 is a logical block diagram illustrating approximate quantile summary management, according to some embodiments. Approximate quantile summary (AQS) management 600 may be implemented, in some embodiments, to generate and update approximate quantile summaries for database tables. Table statistics 630, similar to table statistics 590, may store approximate quantile summaries generated and updated by AQS management 600.

AQS management 600 may implement AQS generation 620 to generate AQSs for database tables, in some embodiments. AQS generation 620 may perform various types of AQS generation techniques. For example, AQS generation techniques may determine quantile boundaries for an identified, specified, or otherwise determined number of quantiles for a column (e.g. 1,000 quantiles so that each quantile within the AQS represents 1/1000 of the total number of column values) without first ordering or sampling the values in the column, in some embodiments. Instead, approximate quantile summary generation techniques may process column values using a stream processing model, distributed processing or other techniques that may process each column value as it is received (e.g., read from storage, received as part of an upload or other ingestion operation, or specified in a query) so that all column values may be included in the approximate quantile summary, in some embodiments. In this way, all column values may be included in the approximate the quantile summary in a single pass, saving significant processing time and cost, so that the approximate quantile summary is generated without performing multiple iterations over all of the column values or sampling the column values (which does not include or consider all column values and may result in quantile summaries with higher error). Various examples of approximate quantile summary generation techniques may include, but are not limited to, the Greenwald-Khanna (GK) algorithm, the Q-Digest algorithm, or the T-Digest algorithm or other techniques that process data values as a stream, in a single pass, to determine the quantile summary boundary values. In at least some embodiments, AQS generation 620 may determine generation instructions 612 and provide them to data processing (e.g., at compute nodes 420 in FIG. 4) to perform an AQS generation technique with respect to data that is stored or received at the data processing component.

In some embodiments database tables may be partitioned with different nodes or groups of nodes responsible for processing requests directed to the partitions so that data processing for partitions(s) 650 may receive the instructions, in some embodiments. In some embodiments, data processing, such as data processing for different partitions 650, may send back the generated AQS(s) 614 to AQS management which may store them in table statistics 630. However, in other embodiments, other components, nodes, or services may perform offline generation of the approximate quantile summary or generation as part of a background process and thus may receive instructions from AQS management 600 (or may implement AQS management 600 or portions thereof separate from data warehouse service 300), in some embodiments.

AQS generation 620 may perform AQS generation for a column in different scenarios. For example, a query 602 may specify a predicate for a column for which no AQS exists. AQS generation may receive an indication of the query (e.g., from request planning 500 in FIG. 5), and begin the generation of the AQS for the column specified by the predicate. In some embodiments, other operations, such as operations that add columns or perform data ingestion 604 may automatically trigger the generation for the new column or new data. In at least some embodiments, an interface, such as the interface implemented by control plane 310 in FIG. 3 for data warehouse service 300 may include an API command or other interface component that can trigger a request 606 to generation an AQS for a column (or multiple columns) of a database table.

AQS management 600 may implement AQS updates 610 to detect update events for AQSs maintained in table statistics 630. Some update events may include, such as AQS update request 606 submitted by a user for the update of AQS(s) or may be included or performed as part of a request to gather, collect, or determine table statistics (e.g., an analyze table command). For example, as discussed below with regard to FIG. 9, AQS updates may determine whether an update to the error value of an AQS should be performed or whether the boundary values of the AQS should be updated. For example, AQS updates 610 may evaluate the amount of changes made to a database with respect to different criteria. Update criteria may include error estimation change thresholds or amount thresholds, amount of change (e.g., size of data added, modified, or deleted, or number of rows added, modified, or deleted), receipt of requests (e.g., requests to drop a partition of database table), or various other criteria that may indicate that an update to an AQS for a column should be performed. AQS updates 610 may send instructions, similar to AQS generation instructions 612, allow data processing (e.g., at compute nodes 420 in FIG. 4) to perform the calculations to update the AQS (e.g., by providing the AQS boundary values in a data structure or format for the AQS generation technique so that additional values can be considered according to the stream processing and the AQS boundary values adjusted accordingly, in some embodiments. AQS updates 610 may perform operations to store or otherwise update boundary values 622 of an AQS or store or update the error value for an AQS 624.

As noted above, data, such as a database table may be partitioned across different storage devices and may be managed by different compute or other nodes to provide distributed data processing for the data. AQS generation and updates may be performed by distributing the generation and update of AQS so that a respective AWS is generated for the values of a column in a partition. In FIG. 6, for instance, each table partition may be maintained as an AQS for a separate partition 640, in some embodiments. Like an AQS for an a column of an entire, boundary values 642 for the quantiles of the partition 640 may be maintained as well as an error value 644 for the table partition, in some embodiments. The AWS generated for each partition may be combined (e.g., individual q-digests generated for each partition of a table may be combined into a single q-digest for an entire table) in order to create the AQS for the column of the entire table. In some embodiments, an update event may be detected for a single table partition's AQS (e.g., based on the number of updates to the partition of the table, such as additions, modifications, or deletions). The AQS for the table partition may be regenerated and combined with the current AQS of other partitions to update the AQS for the entire table, in some embodiments.

Figure 7:
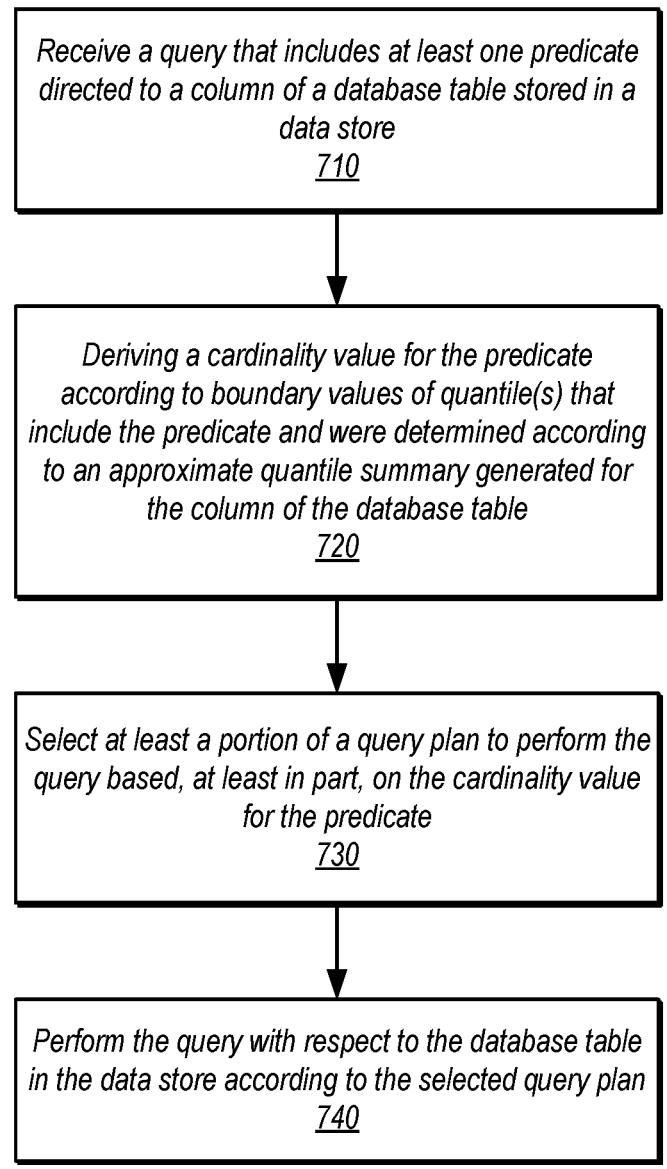
FIG. 7 is a high-level flowchart illustrating methods and techniques to derive cardinality values from an approximate quantile summary, according to some embodiments.

Although FIGS. 2-6 have been described and illustrated in the context of a provider network implementing different services, like data warehousing service 300, the various components illustrated and described in FIGS. 2-6 may be easily applied to other data processing or storage systems that process access requests and other queries to data on behalf of clients. As such, FIGS. 2-6 are not intended to be limiting as to other embodiments of deriving cardinality values from an approximate quantile summary. FIG. 7 is a high-level flowchart illustrating methods and techniques to derive cardinality values from an approximate quantile summary, according to some embodiments. Various different systems and devices may implement the various methods and techniques described below, either singly or working together. For example, a processing cluster, such as described above with regard to FIGS. 4-6, may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, a query may be received that includes at least one predicate directed to a column of a database table stored in a data store, in some embodiments. A database table may include one or multiple columns which may be described according to a table schema that specifies column names, column, types, and column values, for which each entry or row in the database table may have a value specified (or may have a null value specified if allowed by the schema). In some embodiments, a database table may refer to a collection of items that may be queried and that are associated together. For example, a database table in a non-structured or semi-structured database (e.g., a NoSQL database) may include items for which a schema can be inferred—even if the schema is not enforced. For example, items in the database table could have common attributes e.g., "date" which, although not required by the schema could be considered a column as each may represent a common attribute for which a respective values is stored in the different items. Techniques discussed above and below with respect to an AQS could be performed with respect to an inferred column, in some embodiments.

The predicate in the query may identify a column and a criteria for that column (e.g., that can be evaluated to determine a Boolean result, True or False), in some embodiments. As indicated at 720, a cardinality value for the predicated can be derived according to boundary values of quantile(s) determined according to an approximate quantile summary generated for the column of the database table. For example, the predicate criteria (e.g., a point or range of values) can be mapped into the distribution of column values in the AQS according to the boundary values (e.g., by comparing the predicate criteria with boundary values of the criteria to discover which quantile(s) bound the predicate criteria). The predicate may not be the only predicate in the query. Other predicates may be included directed to other columns in the database table or columns in other database tables that may be joined with the database table may be included.

The cardinality value can be derived from the boundary value(s) in different ways. For example, in some embodiments, the percentage or fraction of total values in the column that satisfies the predicate may be determined by the space occupied within the distribution of predicate values by performing a linear interpolation. The boundary values are the known values that map a column value to a percentage (e.g., the minimum boundary value for a quantile being 10,235 and the maximum value for the quantile being 10,792 for the 11$^{th}$ quantile where each quantile is equal to ⅟₅₀₀ (0.002) of the total distribution of column values) so that the space occupied by the predicate (e.g. a range predicate with values of 10,300 to 10,600) can be determined. Consider the examples given above. The two known values for performing linear interpolation may be the minimum boundary value ($X_1$=10,235, $Y_1$=0.0200) and the maximum boundary value ($X_2$ 10,792, $Y_2$=0.0220), where X represents the column value and Y represents the percentage values (with the 11$^{th}$ quantile representing the ordered percentage values of 10×0.02=0.0200 for the minimum and 11×0.0220). The boundaries of the range predicate can be determined by performing linear interpolations (e.g., where the unknown percentage values $Y_{min}$ and $Y_{max}$ can be determined by performing separate linear interpolations using ($X_1$, $Y_1$) and ($X_2$, $Y_2$), $X_{min}$, and $X_{max}$. For example:

$$Y_{min} = Y_1 + (X_{min} - X_1)\frac{Y_2 - Y_1}{X_2 - X_1} \text{ and}$$

$$Y_{max} = Y_1 + (X_{max} - X_1)\frac{Y_2 - Y_1}{X_2 - X_1}$$

may perform example linear interpolations that result in a predicate min value $X_{min}$=10,300 $Y_{min}$=0.0202 and that the predicate max value $X_{max}$=10,600 $Y_{max}$=0.0213. Thus the space within the distribution occupied by the predicate range would be equal to $Y_{max}$-$Y_{min}$, which equals 0.0011. This space may represent the percentage or fraction of column values that satisfies the range predicate. To determine the cardinality value, the percentage may be multiplied by the total number of rows, entries or items in the database table (e.g., 0.0011×1,000,000 rows in the table=1,100 rows that satisfy the range predicate). This technique may be performed for range predicates that span multiple quantiles. In some embodiments, the space occupied by a range predicate for each quantile may be separately calculated (though the space for range predicates that cover an entire quantile may be the value of the quantile (e.g., ⅟₅₀₀ in the above example). The same technique may be performed to determine the percentage for a point predicate value by performing one linear interpolation. Because approximate quantile summaries generated according to stream-based processing techniques may be quickly generated with a large number of quantiles (e.g., 1,000), the fidelity of determining the percentage of values that may satisfy a predicate according to an interpolation of the space occupied by a predicate may be performed with greater accuracy than for quantile summaries that have a small number of quantiles (e.g., 10), in some embodiments.

In some embodiments, the quantile boundary values may be used to derive the cardinality values by counting the number of quantiles that include the predicate. The count of quantiles may be multiple by the quantile percentage for individual quantiles which in turn may be multiplied by the total number of rows, entries or items in the table to determine the cardinality value. For example, if a quantile is ⅟₁₀₀₀ of a column distribution, and the predicate is a range predicate that is included within 4 quantiles, and the number of items in the table is 5,000,000, then the cardinality value may be 4×0.001×5,000,000=20,000. Note that other techniques to map or derive cardinality values from the boundary values of quantiles that include the query may be performed, and thus the previous examples are not intended to be limiting.

As indicated at 730, at least a portion of a query plan may be selected to perform the query based, at least in part, on the cardinality value for the predicate. For example, the cardinality value may be input into a cost model or function which may determine the cost of different operations performed with respect to that predicate. One of the operations (or different configurations or orderings of operations) may be selected for performance based on the cost value determined from the cardinality value.

As indicated at 740, the query may be performed with respect to the database table in the data store according to the selected query plan. The predicate may not be the only predicate in the query, in some embodiments. In some embodiments, the database table may not be the only database table indicated in the query. The other predicates may be directed to the other database tables. The techniques discussed above may be performed to derive cardinality values for the other predicates of the other database tables and used to select the query plan, in some embodiments.

The generation of an approximate quantile summary may be performed in different ways and in different scenarios. FIG. 8 is a high-level flowchart illustrating methods and techniques to generate an approximate quantile summary for deriving cardinality values, according to some embodiments. As indicated at 810, in some embodiments, an approximate quantile summary for a column of a database table may be generated in some embodiments. Instead of performing an offline, quantile summary generation technique, approximate quantile summaries may be generated as data is ingested, stored, or otherwise added to the database table, or scanned or read from the database table, in some embodiments. For example, a stream processing model may be implemented to identify and update quantile boundary values for an AQS for a column of a database table as the column values are obtained (e.g., read from storage or received to be placed into storage) so that all column values may be included in the approximate quantile summary in a single pass over the column values (instead of being generated from a sample of column values or by a multiple pass, non-streaming quantile summary generation technique). Different stream processing AQS generation techniques may be performed, including the Greenwald-Khanna (GK) algorithm, the Quantile Digest (Q-Digest) algorithm, or the T-Digest algorithm. In some embodiments, a user or client may specify a number of quantiles to determine for the column (e.g., 500, 1,000, etc.) in a request to generate the AQS for a column or may specify it as setting or configuration for AQS generation that is automatically performed (e.g., when data is ingested or added to the database table).

Generation of an AQS for a column may be performed in response to different triggering events or conditions. For example, a query may be received that includes a predicate directed to a column for which there is no AQS generated, which could trigger the generation of an AQS for the column prior to (or after) the performance of the query, in one embodiment. In another embodiment, another cardinality estimation model, technique, or statistics for a column may be determined to be above an error threshold, triggering the generation of an AQS for the column. In one embodiment, the frequency with which a column is used as a predicate may be tracked for a database table so that if the frequency crosses an AQS generation threshold, AQS generation may be triggered for that column. AQS generation may be triggered automatically upon data ingestion, table creation, or other operation to store data into a table. In some embodiments, AQS generation may be performed as a background operation that is performed, paused, or aborted when processing demands (e.g., query performance workload) rises above an AQS generation threshold for background processing. The AQS for the column may be stored separate metadata store for table statistics or in a statistics store co-located with a query optimizer or other part of a query engine that may access the AQS to derive cardinality values.

As indicated at 820, a query may be received that includes at least one predicate directed to the column of the database table, in some embodiments. The predicate in the query may identify a column and a criteria for that column (e.g., that can be evaluated to determine a Boolean result, True or False), in some embodiments. As indicated at 830, the quantiles of the AQS may be evaluated to identify boundary values of one or more quantiles that include the query predicate, in some embodiments. For example, by comparing the predicate criteria with boundary values of the criteria of the predicate to discover which quantile(s) bound the predicate criteria. Predicate criteria may include a point value or a range of values (e.g., by specifying a minimum and maximum value).

As indicated at 840, a cardinality value may be derived for the predicate according to the identified boundary values of the quantile(s), in some embodiments. For example, in some embodiments, the percentage or fraction of total values in the column that satisfies the predicate may be determined by the space occupied within the distribution of predicate values by performing a linear interpolation. The boundary values are the known values that map a column value to a percentage so that the percentage or fraction of values that satisfy the predicate can be determined. In another example embodiment, the number of quantiles that include the predicate may be counted and then may be multiple by the quantile percentage for individual quantiles, which in turn may be multiplied by the total number of rows, entries or items in the table to determine the cardinality value.

As indicated at 850, at least a portion of a query plan may be selected to perform the query based, at least in part, on the cardinality value for the predicate. For example, the cardinality value may be input into a cost model or function which may determine the cost of different operations performed with respect to that predicate. One of the operations (or different configurations or orderings of operations) may be selected for performance based on the cost value determined from the cardinality value. As indicated at 860, the query may be performed with respect to the database table in the data store according to the selected query plan.

Figure 9:
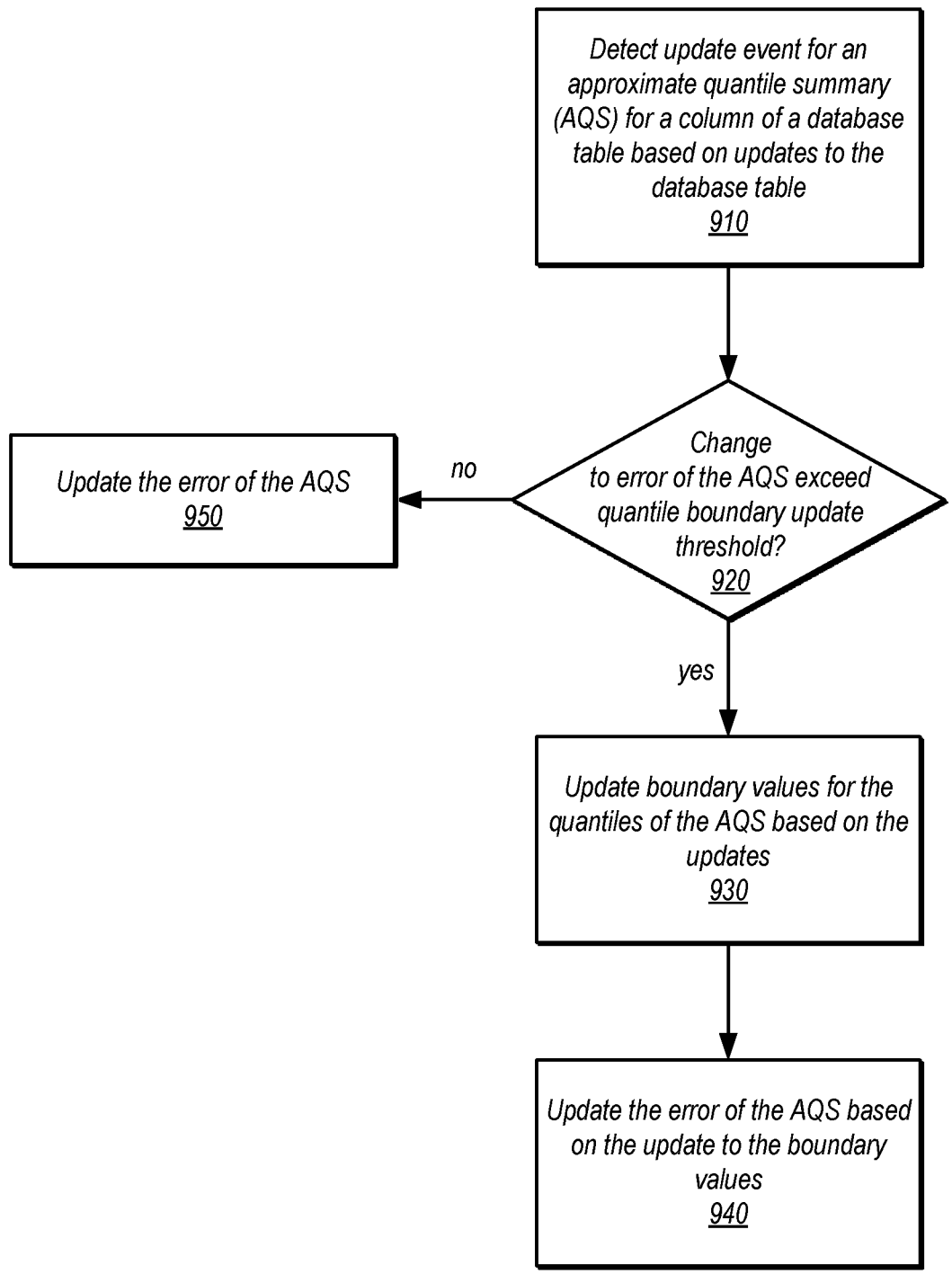
FIG. 9 is a high-level flowchart illustrating methods and techniques to perform updates to approximate quantile summaries, according to some embodiments.

FIG. 9 is a high-level flowchart illustrating methods and techniques to perform updates to approximate quantile summaries, according to some embodiments. As indicated at 910, an update event for an approximate quantile summary (AQS) may be detected for a column of a database table based on additions, deletions, or modifications to the database table, in some embodiments. For example, criteria specifying the size or amount of updates to the database table (e.g., number of rows added, modified, or deleted) may be monitored to detect an update event for the AQS. In some embodiments, data ingestion or other operations, such as requests to delete a partition may trigger an update event for an AQS for a column. As discussed above with regard to FIG. 6, the database table may be stored in partitions, in some embodiments, so update events may be performed specific to an AQS for an individual partition (which can then be merged with the AQSs for the other partitions to update the AQS for the column).

An update event may trigger different kinds of updates to an AQS. For example, some updates may trigger updates to the error value for the AQS. As indicated at 920, a determination may be made as to whether the updates to the AQS (without changing the boundary values) exceed a quantile boundary update threshold, in some embodiments. For example, the error value generated for an AQS may be dependent on the number of rows or items included in the AQS. As the number of items grows, the error value may grow. If, for instance, error value=EN, where N is the number items in the AQS, then the error value may grow as the number of items in the AQS grows. The quantile boundary update threshold may be a change or absolute size threshold for the error of the AQS which if not exceeded by the change determined from the number of items added or removed from the database table (or modified) may then update the error value of the AQS, as indicated at 950. For example, in some embodiments queries may be processed as discussed above with regard to FIGS. 7 and 8, wherein the quantile boundary values may be compared to the predicate including the error value (e.g., as an error bar) so that if the predicate falls within the margin of a quantile boundary, multiple cardinality values may be determined using different boundary values, or one may be selected (e.g., based on the predicates relative location within the margin of error so that predicates with values almost outside of the margin of error (as may be defined by a percentage or threshold)). Please note that error calculations may be dependent upon the approximate quantile summary technique selected, and thus the previous examples are not intended to be limiting.

If the change to the error of the AQS exceeds a quantile boundary update threshold, then boundary values for the quantiles of the AQS may be updated based on the additions, modifications, or deletions to the database table, as indicated at 930, in some embodiments. For example, the additional data may be input into the AQS generation algorithm as additional values in the "stream" of values so that boundary values for the quantiles may be adjusted, if needed. For deletions, the update may include re-generating the entire AQS based on the current column values (or the partition for which the update event was triggered, in some embodiments). In at least some embodiments, the error of the AWS may be updated based on the update to the boundary values, in some embodiments, as indicated at 940.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of deriving cardinality values from an approximate quantile summary as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
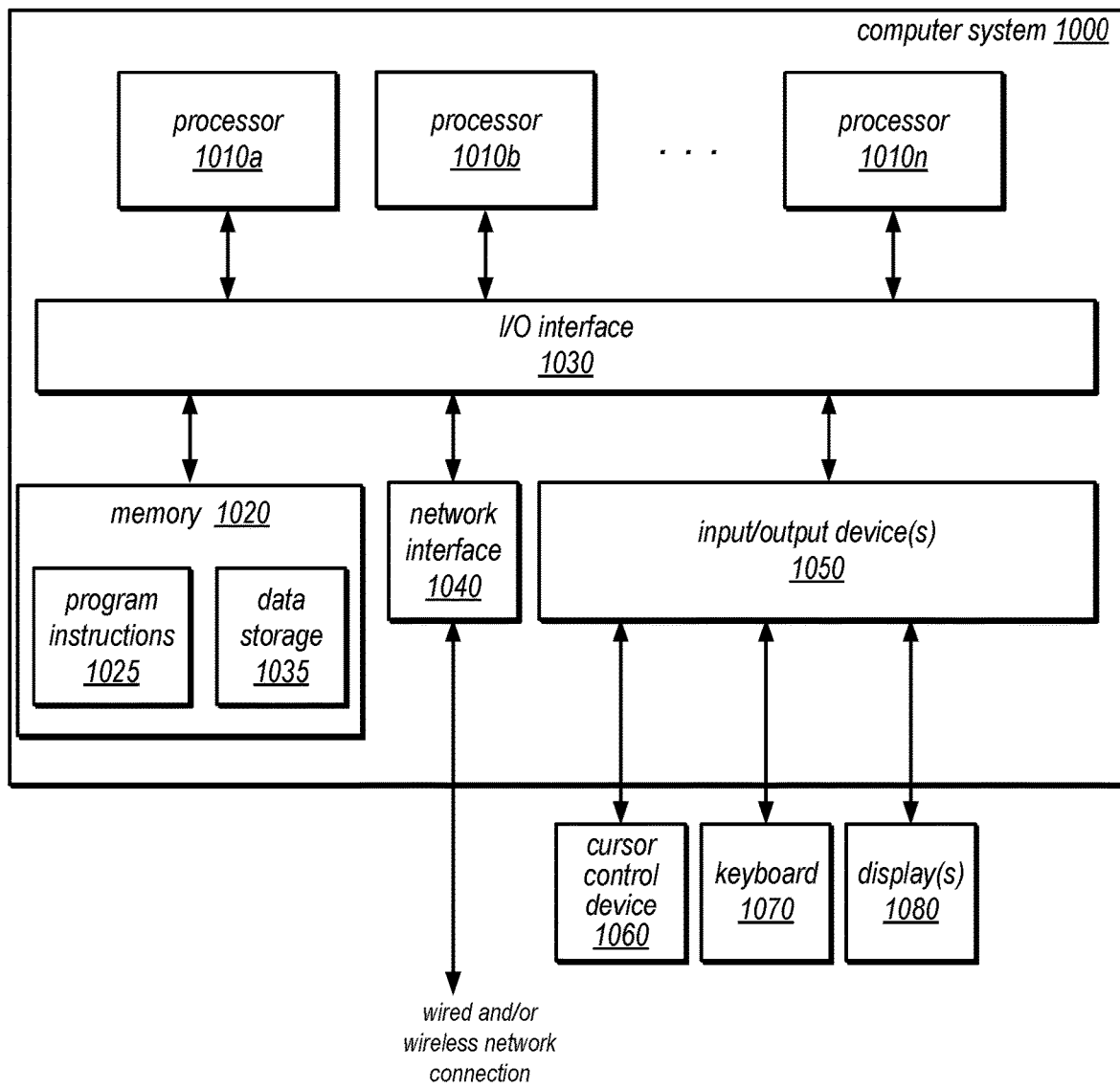
FIG. 10 illustrates an example system to implement the various methods, techniques, and systems described herein, according to some embodiments.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
generate an approximate quantile summary from a single pass over a stream of values of a column of a database table stored in a data store that updates the approximate quantile summary with individual ones of the values of the column as the values of the column are obtained, wherein the approximate quantile summary comprises a plurality of quantiles indicating a distribution of values of the column of the database table within the quantiles;
receive a query comprising at least one predicate directed to the column of the database table;
evaluate the quantiles to identify boundary values of one or more of the quantiles that include the predicate;
derive a cardinality value for the predicate according to the identified boundary values;
select a portion of a query plan to perform the query based, at least in part, on the cardinality value for the predicate; and
perform the query with respect to the database table in the data store according to the selected portion of the query plan.

2. The system of claim 1, wherein the database table is stored across different partitions in the data store and wherein to generate the approximate quantile summary, the method further cause the at least one processor to:
generate respective approximate quantile summaries for individual ones of the different partitions; and
combine the respective approximate quantile summaries for the different partitions into the approximate quantile summary for the column of the database table.

3. The system of claim 1, wherein the method further causes the at least one processor to:
detect an update event for the approximate quantile summary based, at least in part, on one or more updates to the database table;
in response to the detection of the update event, update at least one of the boundary values of at least one of the quantiles according to the updates to the database table.

4. The system of claim 1, wherein the data store is a data warehouse service implemented as part of a provider network that stores the database table as part of a database hosted by the data warehouse service, wherein the database table is stored in column-oriented format, and wherein the predicate is a range predicate.

5. A method, comprising:
receiving a query comprising at least one predicate directed to a column of database table stored in a data store;
deriving a cardinality value for the predicate according to boundary values of one or more quantiles that include the predicate, wherein the quantiles are determined according to an approximate quantile summary generated from a single pass over a stream of values of the column of the database table that updates the approximate quantile summary with individual ones of the values of the column as the values of the column are obtained;
selecting a portion of a query plan to perform the query based, at least in part, on the cardinality value for the predicate; and
performing the query with respect to the database table in the data store according to the selected portion of the query plan.

6. The method of claim 5, further comprising generating the approximate quantile summary for the column of the database table.

7. The method of claim 6, wherein the database table is stored across different partitions in the data store and wherein generating the approximate quantile summary for the column of the database table comprises:
generating respective approximate quantile summaries for individual ones of the different partitions; and
combining the respective approximate quantile summaries for the different partitions into the approximate quantile summary for the column of the database table.

8. The method of claim 6, further comprising:
receiving a request to generate the approximate quantile summary for the column of the database table; and
in response to receiving the request, performing the generating of the approximate quantile summary.

9. The method of claim 5, wherein deriving the cardinality value for the predicate according to the boundary values comprises:
determining a percentage of column values in the database table that satisfy the predicate based, at least in part, on respective column values mapped to the boundary values; and
multiplying the percentage of the column values by a number of rows in the database table to determine the cardinality value.

10. The method of claim 5, further comprising updating at least one of the boundary values of at least one of the quantiles in the approximate quantile summary based, at least in part, on performance of the query with respect to the database table in the data store.

11. The method of claim 5, further comprising:
detecting an update event for the approximate quantile summary based, at least in part, on one or more updates to the database table;
in response to detecting the update event, updating an error value for the approximate quantile summary based, at least in part, on the one or more updates to the database table.

12. The method of claim 5, further comprising:
detecting an update event for the approximate quantile summary based, at least in part, on one or more updates to the database table;
in response to detecting the update event, updating at least one of the boundary values of at least one of the quantiles according to the updates to the database table.

13. The method of claim 5, wherein the query includes another predicate directed to another column of another database table, wherein the other database table is included as part of a same database as the database table, wherein the deriving is performed to derive another cardinality value for the other predicate according to boundary values from another approximate quantile summary generated for the other column in the other database table, wherein the selection of the query plan is further based on the other cardinality value for the other predicate.

14. A non-transitory, computer-readable storage medium, storing program instructions that when executed by one or more computing devices cause the one or more computing devices to implement:
   receiving a query comprising at least one predicate directed to a column of database table stored in a data store;
   evaluating the query to identify boundary values of one or more quantiles that include the predicate, wherein the quantiles are determined according to an approximate quantile summary generated from a single pass over a stream of values of the column of the database table that updates the approximate quantile summary with individual ones of the values of the column as the values of the column are obtained;
   deriving a cardinality value for the predicate according to the identified boundary values;
   selecting a portion of a query plan to perform the query based, at least in part, on the cardinality value for the predicate; and
   performing the query with respect to the database table in the data store according to the selected portion of the query plan.

15. The non-transitory, computer-readable storage medium of claim 14, wherein the program instructions cause the one or more computing devices to further implement generating the approximate quantile summary for the column of the database table.

16. The non-transitory, computer-readable storage medium of claim 15, wherein the program instructions cause the one or more computing devices to further implement:
   receiving column values to store in the column of the database table; and
   in response to receiving the column values, performing the generating of the approximate quantile summary as the column values are received.

17. The non-transitory, computer-readable storage medium of claim 14, wherein, in deriving the cardinality value for the predicate according to the boundary values, the program instructions cause the one or more computing devices to implement:
   determining a percentage of column values in the database table that satisfy the predicate based, at least in part, on respective column values mapped to the boundary values; and
   multiplying the percentage of the column values by a number of rows in the database table to determine the cardinality value.

18. The non-transitory, computer-readable storage medium of claim 14, wherein the program instructions cause the one or more computing devices to further implement:
   detecting an update event for the approximate quantile summary based, at least in part, on one or more updates to the database table; and
   in response to detecting the update event, updating an error value for the approximate quantile summary based, at least in part, on the one or more updates to the database table.

19. The non-transitory, computer-readable storage medium of claim 14, wherein the database table is stored across different partitions in the data store, wherein the approximate quantile summary is generated from respective approximate quantile summaries generated for individual ones of the different partitions, and wherein the program instructions cause the one or more computing devices to further implement:
   detecting an update event for the respective approximate quantile summary for one of the different partitions based, at least in part, on one or more updates to the database table applied to the one partition;
   in response to detecting the update event, regenerating the respective approximate quantile summary for the one partition inclusive of the updates to the database table applied to the one partition; and
   updating the approximate quantile summary for the column of the database table based on the regenerated respective approximate quantile summary for the one partition.

20. The non-transitory, computer-readable storage medium of claim 14, wherein the program instructions cause the one or more computing devices to further implement selecting one or more resources to perform the query based, at least in part, on the cardinality value for the predicate and wherein the query is performed at the selected resources.

* * * * *